Figure 1:
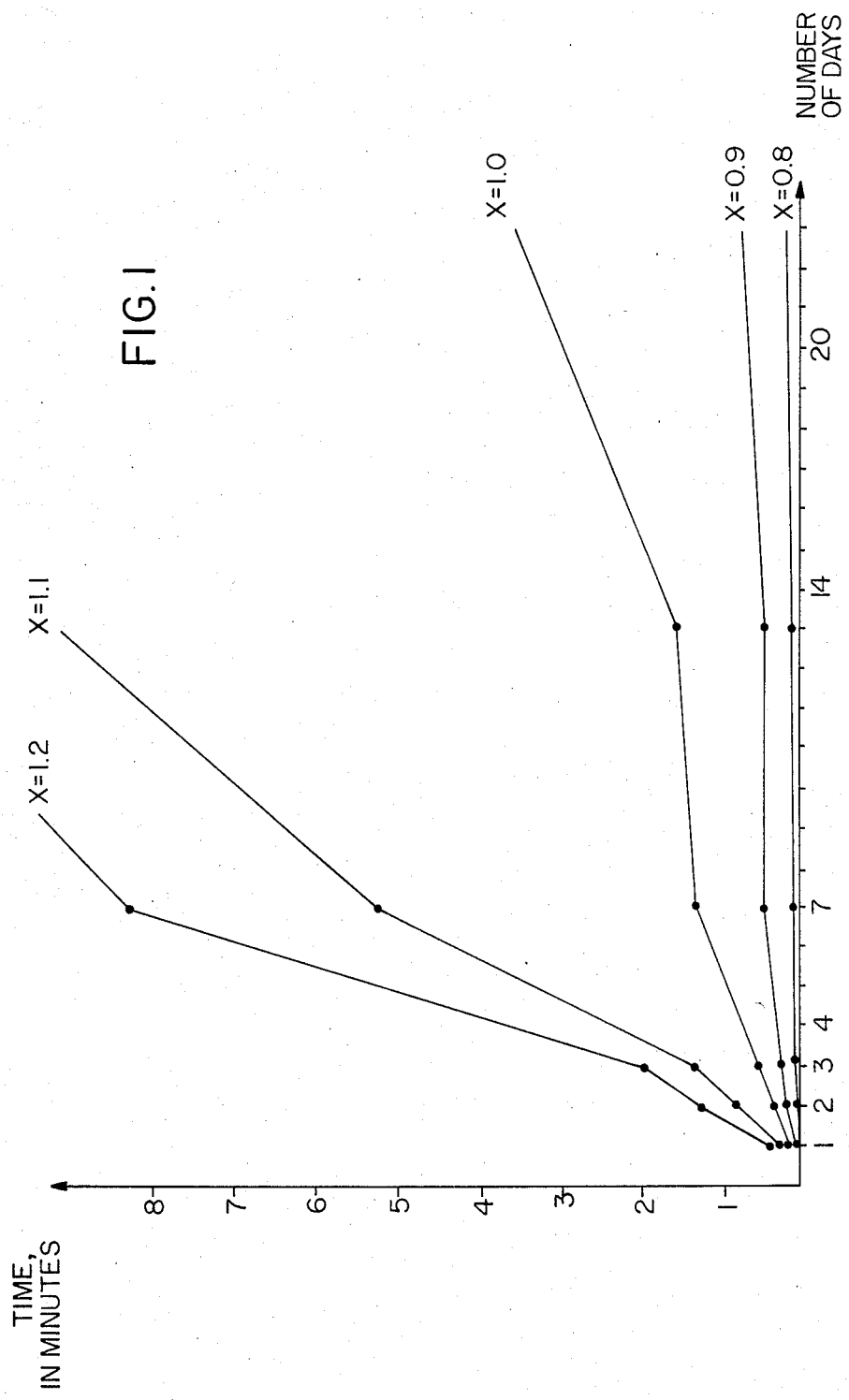
Figure 2:
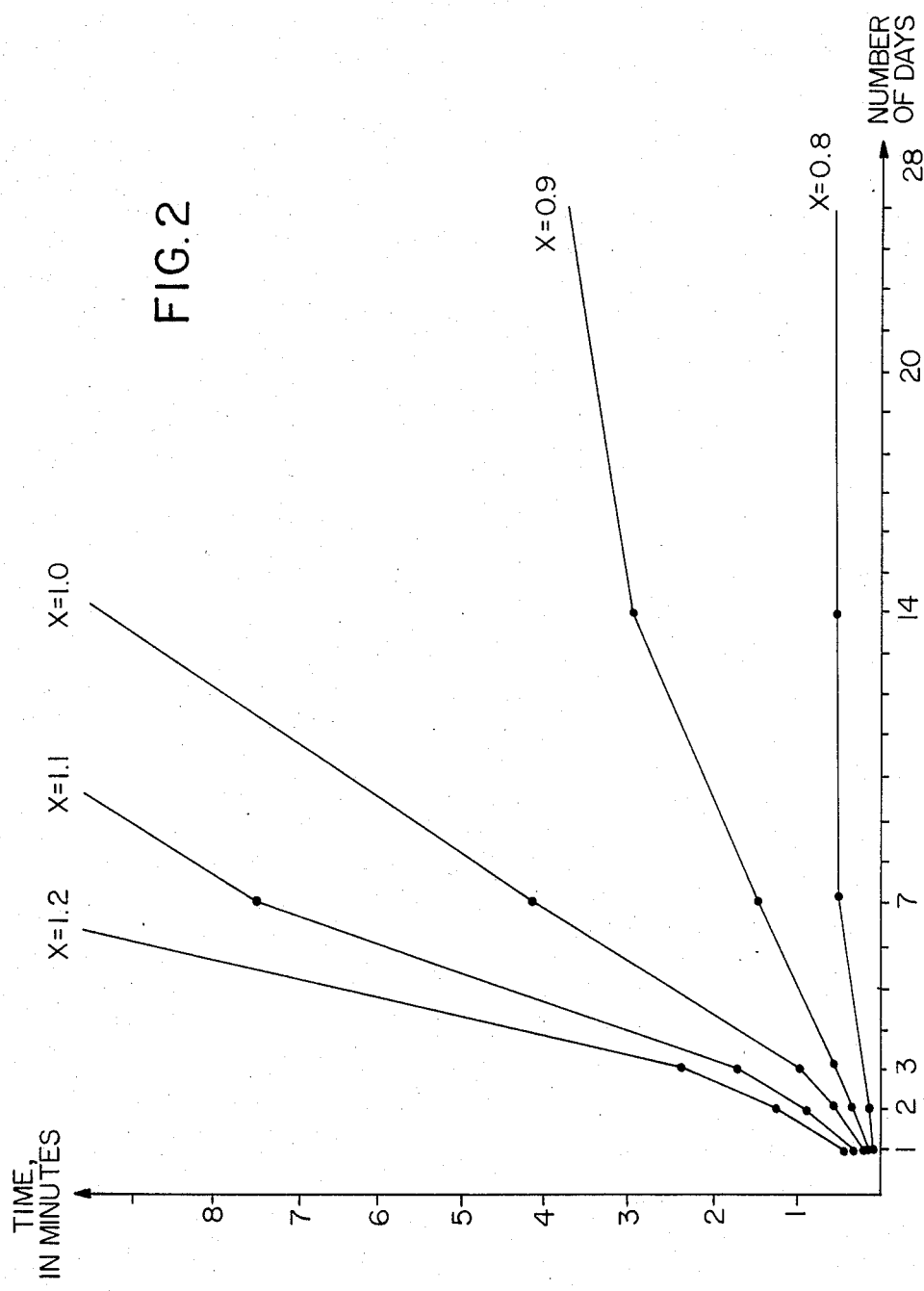
Figure 3:
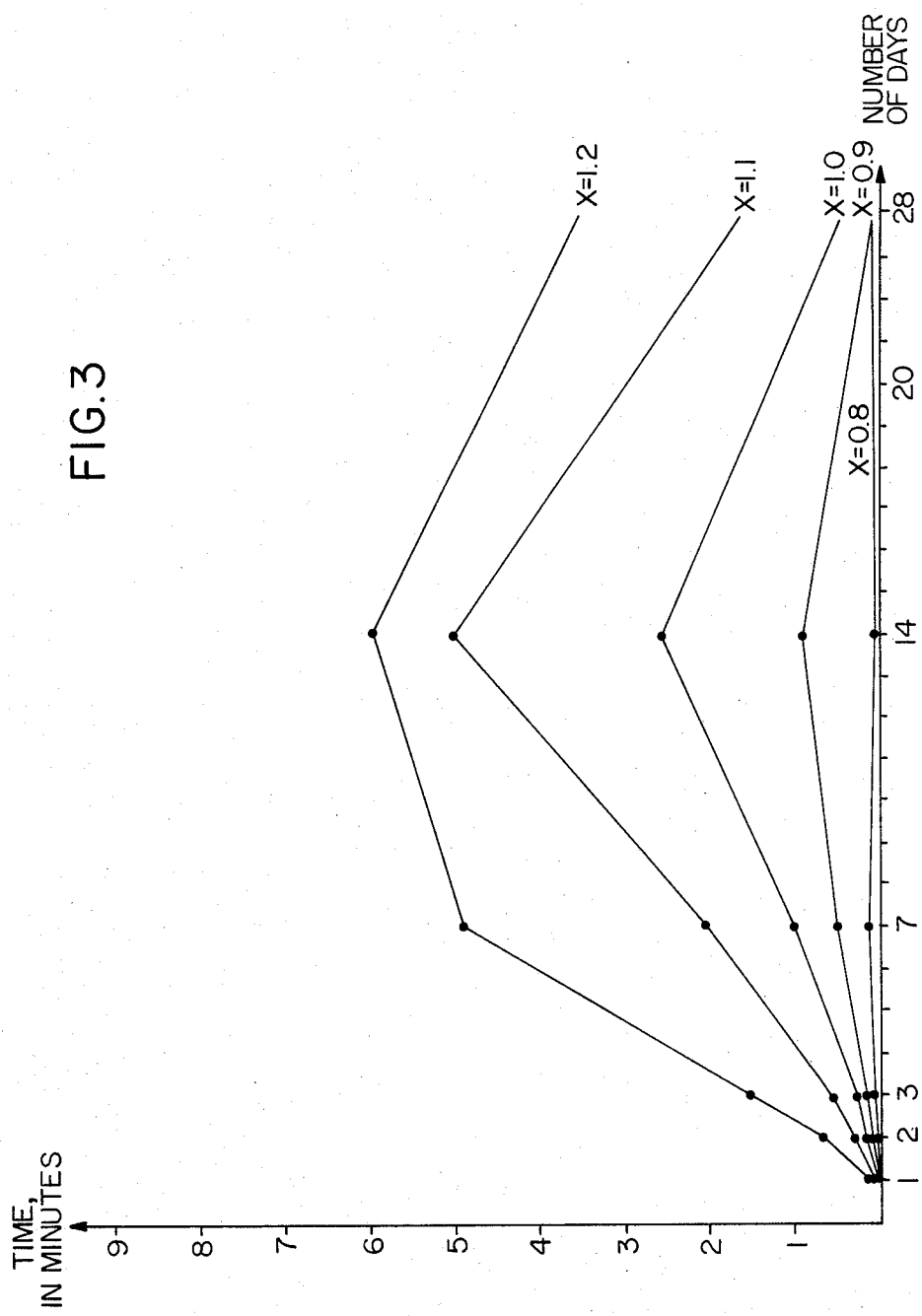
Figure 4:
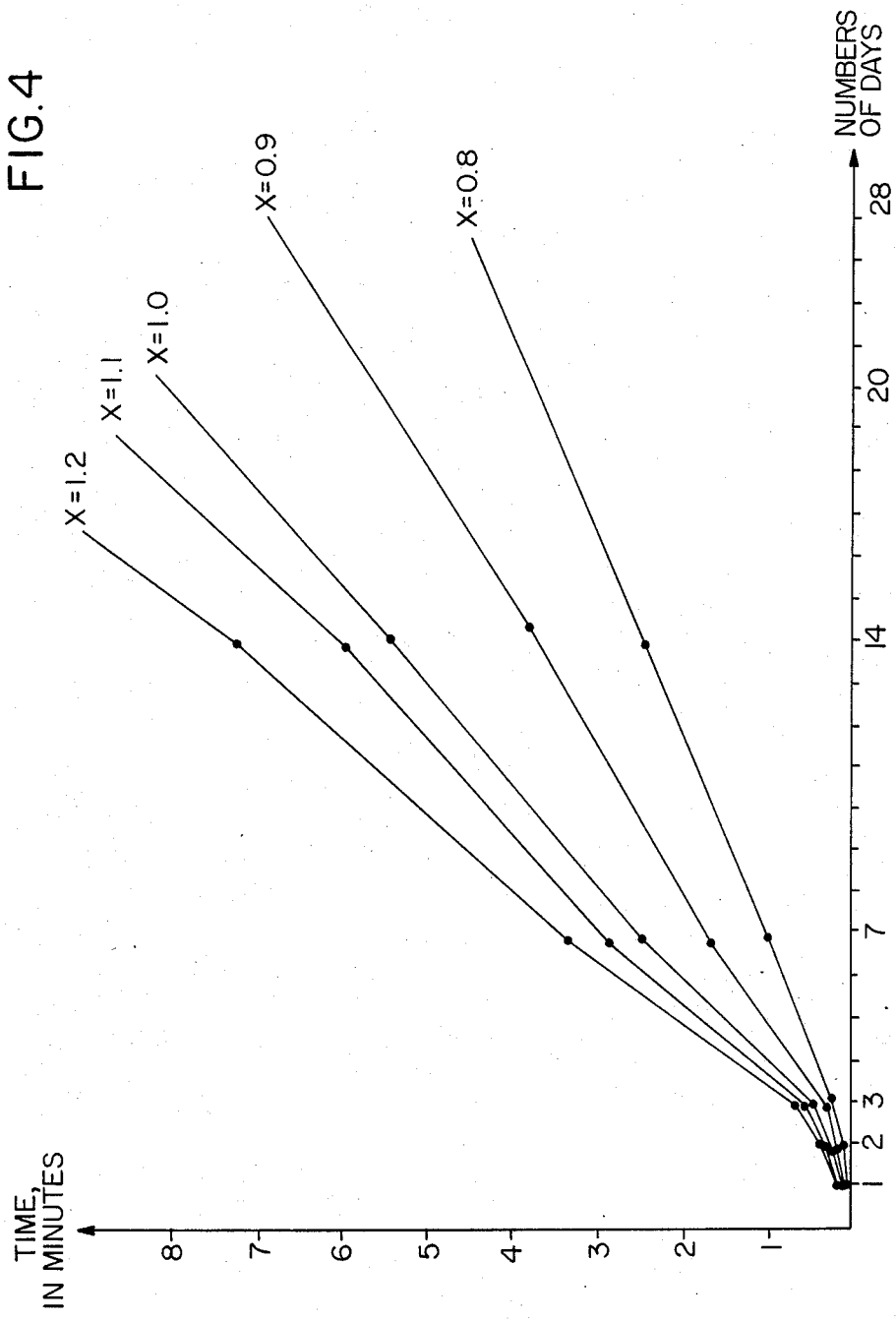
Figure 5:
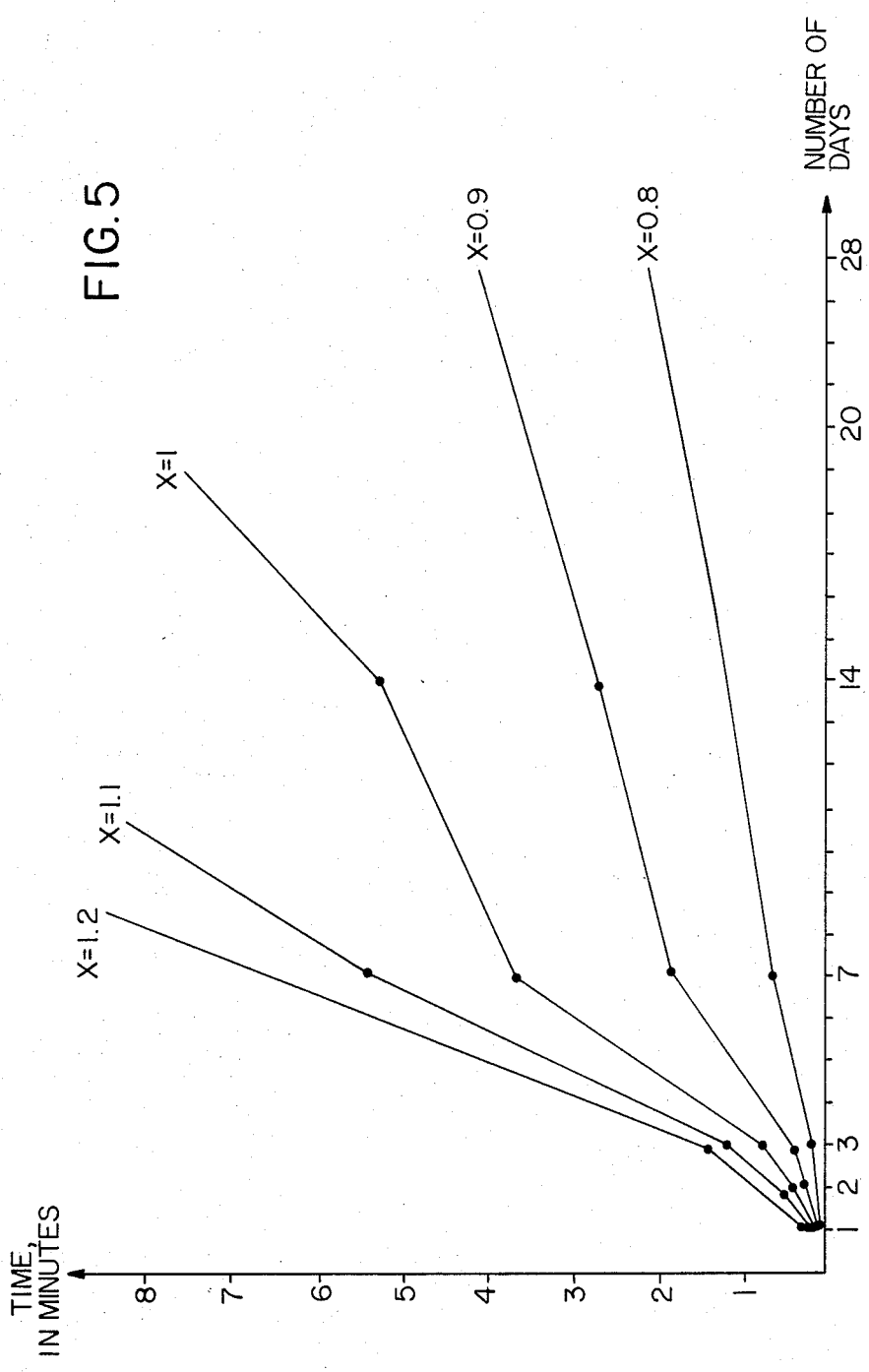
Figure 6:
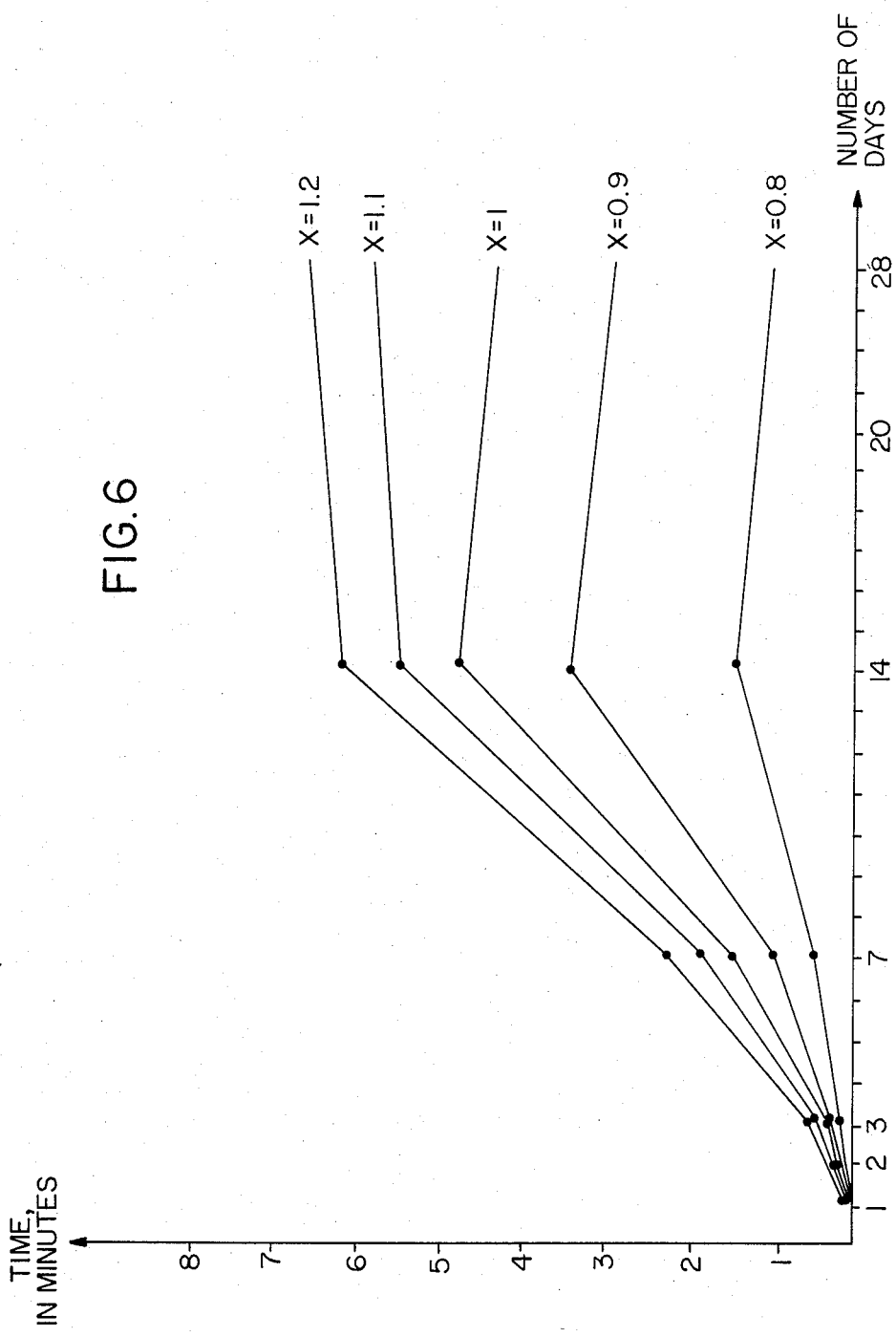
Figure 7:
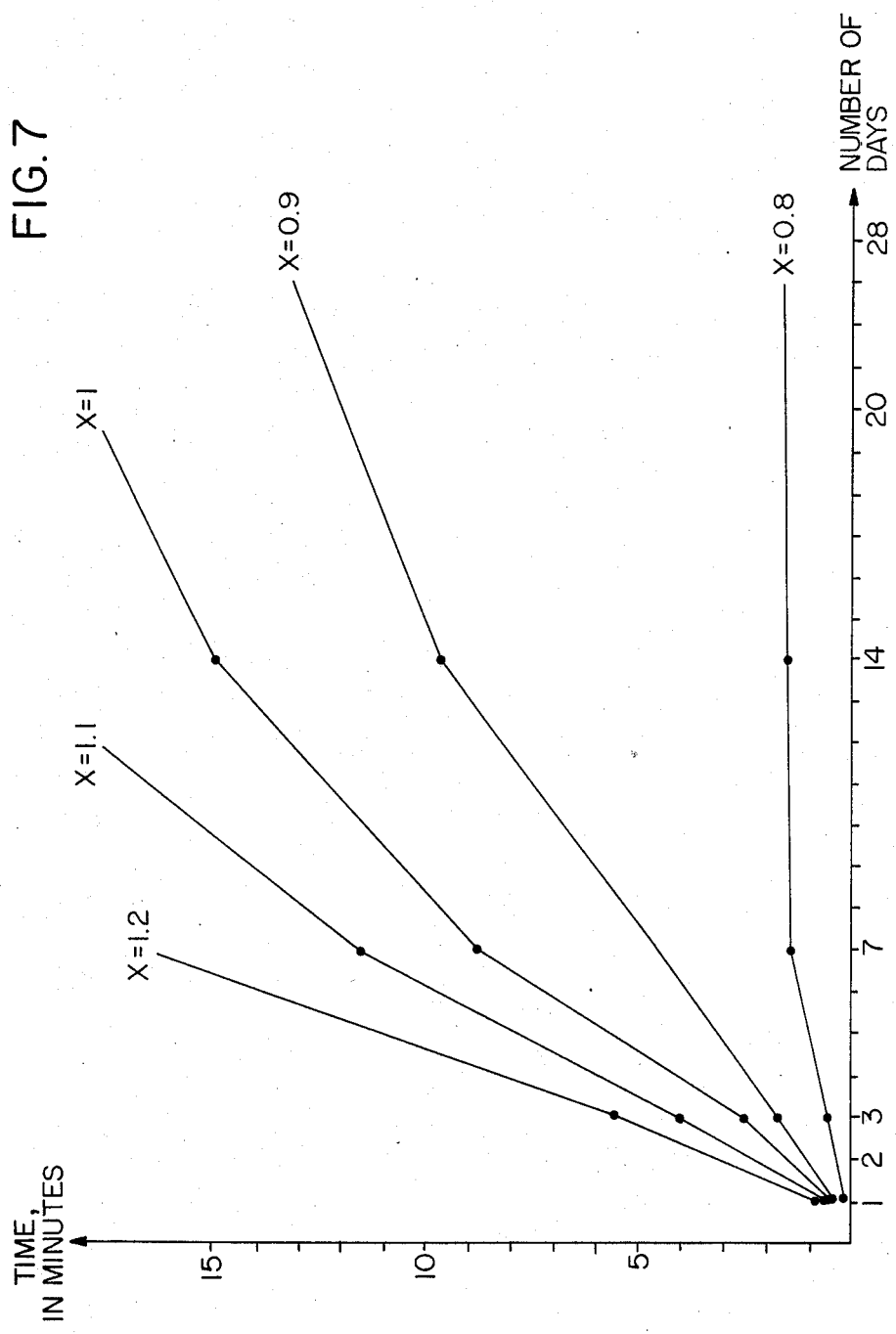
Figure 8:
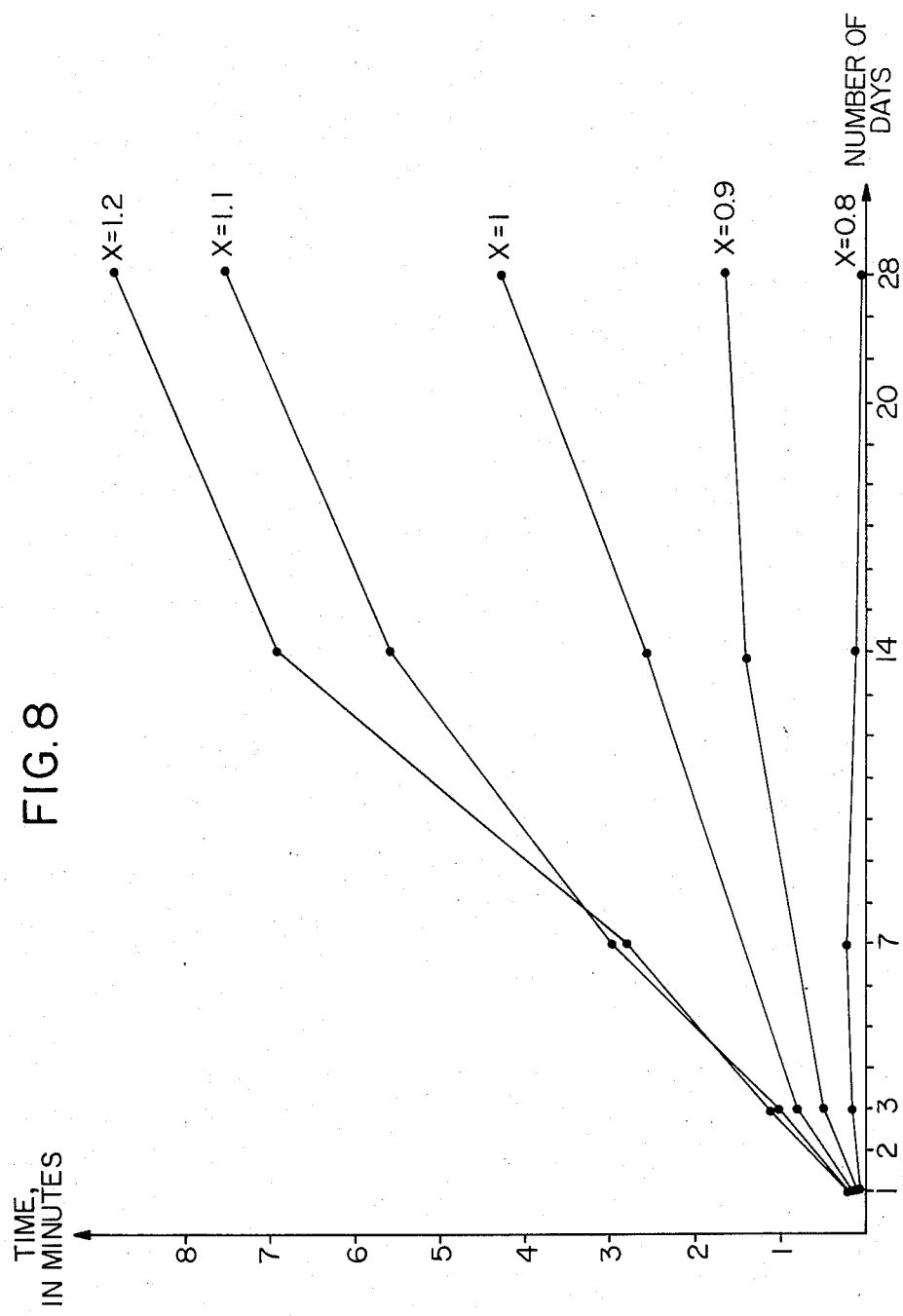

United States Patent [19]

Arlaud et al.

[11] Patent Number: 4,663,393

[45] Date of Patent: May 5, 1987

[54] PROCESS FOR THE MANUFACTURE OF UNSATURATED POLYESTER RESINS EXHIBITING LINEAR MATURING WITH MAGNESIA

[75] Inventors: Patrick Arlaud, Chauny; Hervé Bompis; Pierre Canard, both of Autreville, all of France

[73] Assignee: Societe Chimique des Charbonnages S.A., Paris la Defense, France

[21] Appl. No.: 787,351

[22] Filed: Oct. 15, 1985

[30] Foreign Application Priority Data

Oct. 12, 1984 [FR] France ................................ 84 15645

[51] Int. Cl.$^4$ .......................... C08F 8/00; C08L 67/02
[52] U.S. Cl. ..................................... 525/165; 525/169; 525/445; 528/303; 528/304
[58] Field of Search ....................... 525/165, 169, 445; 528/303, 304

[56] References Cited

U.S. PATENT DOCUMENTS

| 3,196,131 | 7/1965 | Mayer et al. | 260/75 |
| 4,046,739 | 9/1977 | Lacona | 528/272 |
| 4,277,392 | 7/1981 | Feldman et al. | 528/303 X |
| 4,292,218 | 9/1981 | Corrado et al. | 528/303 X |
| 4,425,287 | 1/1984 | Hesse et al. | 264/22 |

FOREIGN PATENT DOCUMENTS 0023634 2/1981 European Pat. Off. .
7705205 11/1978 Netherlands .

*Primary Examiner*—Lucille M. Phynes
*Attorney, Agent, or Firm*—Millen & White

[57] ABSTRACT

Process for the manufacture of unsaturated polyester resins.

Process for the manufacture of unsaturated polyester resins in two steps starting from polyols, orthophthalic anhydride and maleic anhydride.

Production of resins exhibiting linear maturing with magnesia.

23 Claims, 8 Drawing Figures

PROCESS FOR THE MANUFACTURE OF UNSATURATED POLYESTER RESINS EXHIBITING LINEAR MATURING WITH MAGNESIA

BACKGROUND OF THE INVENTION

The present invention relates to a process for the manufacture of unsaturated polyester resins exhibiting linear maturing with magnesia. Its subject is more particularly a process for the manufacture of polyester resins based on ortho-phthalic anhydride, which exhibits linear maturing with magnesia whatever the proportion of magnesia employed.

Polyester resins are known products which are employed in various applications, in particular for the manufacture of preimpregnated materials. The latter materials are made from reinforcing fibres and from unsaturated polyester resins which act as impregnating compositions. In order to produce a material which can be handled and stored before moulding, it is known to add a thickener to the impregnating composition before impregnating the reinforcing fibres.

These impregnating compositions have hitherto been prepared by reacting at least one polyol with one or more $\alpha,\beta$-unsaturated polycarboxylic acids or anhydrides and, if appropriate, one or more saturated polycarboxylic acids or anhydrides. The polycondensate prepared in this way is then dissolved in a crosslinking vinyl monomer. As polyols which are employed, it is possible to mention ethylene glycol, propylene glycol, diethylene glycol, triethylene glycol, tetraethylene glycol, neopentyl glycol, butylene glycol, dipropyleneglycerol, trimethylolpropane, pentaerythritol, trimethylpentanediol, trimethylpropanediol 1,6-hexamethylenediol, and hydrogenated bisphenol A and its derivatives. The $\alpha,\beta$-unsaturated polycarboxylic acids and anhydrides are represented especially by maleic and itaconic acids and anhydrides and fumaric and mesaconic acids. As saturated polycarboxylic acids and anhydrides it is possible to mention succinic, methylsuccinic, adipic, sebacic, ortho-pthtalic, tetrachlorophthalic, hexachloroendomethylenetetrahydrophthalic and trimellitic acids and anhydrides and isophthalic acid. The crosslinking vinyl monomer employed is chosen from styrene, $\alpha$-methylstyrene, chlorinated styrene derivatives, vinyltoluene, divinylbenzene, allyl phthalate, triallyl cyanurate, and the lower alkyl acrylates and methacrylates.

In actual fact, among all these monomers mentioned above, the impregnating compositions are in most cases manufactured by reacting, in a single step, a polyol mixture consisting of propylene glycol or ethylene glycol and diethylene glycol with a mixture of maleic anhydride and ortho-phthalic anhydride. The polycondensate thus produced is dissolved in styrene containing small amounts of an inhibitor such as hydroquinone or benzoquinone (50 to 150 ppm).

The preimpregnated materials are compounds consisting chiefly of a mixture of unsaturated polyester resin, filler, colorant, release agent, glass fibres, crosslinking agent and thickener. This composition, initially liquid, is not sufficiently capable of being handled to be moulded as such. Before the moulding it must be matured to raise its viscosity. One of the known maturing processes consists in manufacturing a sandwich material consisting of the preimpregnated composition, which must retain its polymerization and crosslinking capacity, enclosed between two polyethylene films. The thickener causes an increase in viscosity which makes the sandwich material capable of being handled after a certain time. Typical thickeners include magnesia.

After maturing and, in the case of that mentioned above, removal of the polyethylene films, the preimpregnated materials can be moulded according to the usual hot compression-moulding processes, the crosslinking being produced by decomposition of the crosslinking agent which is usually an organic peroxide.

The thickener added for the maturing causes an increase in the viscosity of the prepregs which must be such that the viscosity is sufficient to permit moulding. When the viscosity is inadequate, major leakages of materials are observed on the mould and, when the viscosity is too high, the prepregs flow poorly in the mould, causing faulty appearance and poor mechanical properties of the moulded part. More precisely, it is found that when the proportion of magnesia is varied in the case of the known unsaturated resins:

at a given time, no maturing below a certain proportion of magnesia, the maturing appearing starting at a certain threshold, after a certain storage time, a loss in plasticity whatever the proportion of magnesia employed, causing non linear variations in maturing.

SUMMARY OF THE INVENTION

Consequently, it is an object of the invention to provide unsaturated polyester resins which exhibit linear maturing whatever the proportion of metallic oxide or hydroxide employed, thus enabling the proportion of the metallic oxide or hydroxide to be adjusted to the prespecified degree of maturing.

The present invention relates to a process for the manufacture of unsaturated polyester resins exhibiting linear maturing with magnesia, according to which, in a first step, at least one polyol is reacted with one or more $\alpha,\beta$-unsaturated carboxylic acids or anhydrides and with one or more saturated polycarboxylic acids or anhydrides, the polycondensate produced being dissolved in a vinyl monomer, which process is characterised in that, in a first step, a mixture of polyols consisting of propylene glycol and di-ethylene glycol is reacted, the quantity of glycols employed in this first step not exceeding 30% by weight based on the total quantity employed in the process, the respective percentages during this first step being between 0 to 20% in the case of diethylene glycol, and 10 to 30% in the case of propylene glycol, this glycol mixture being reacted with all of a saturated polycarboxylic anhydride consisting of ortho-phthalic anhydride, and then, in a second step, the reaction product obtained during the first step is reacted with the remainder of diethylene glycol and propylene glycol and all of an $\alpha,\beta$-unsaturated anhydride consisting of maleic anhydride.

It has been found that, by operating under these conditions, unsaturated polyester resins are obtained which exhibit linear maturing with magnesia. Furthermore, the resins produced according to the invention make it possible to adjust the rate of linear maturing whatever the proportion of magnesia employed. Such behaviour towards magnesia makes possible a wider utilization range of the prepregs made of resins produced according to the invention. The quantities of magnesia which are employed are those which are conventionally employed: they are between 0.5 and 2% and preferably between 0.7 and 1.25% based on the resin weight. Furthermore, the polyester resins prepared according to the invention are especially suitable for the manufacture of injectable compounds, the maufacture of which makes it necessary to have available unsaturated polyester resins which must have a consistency which is:

neither too low, to permit correct and uniform metering of the material and good rheological behaviour during the injection, nor too high, to enable the material to be easily fed into the screw and to permit minimum deterioration of the glass fibres.

According to the invention, the first step is carried out using a mixture of polyols consisting of propylene glycol and diethylene glycol, the quantity of glycols employed in this first step not exceeding 30% by weight based on the total quantity employed in the process, the respective percentages during this first step being between 0 to 20% in the case of diethylene glycol and from 10 to 30% in the case of propylene glycol.

According to the process of the invention, the polyol mixture thus defined is reacted with all of the orthophthalic anhydride. This reaction is carried out in a known manner at a temperature of between 160° and 220° C. and preferably in the region of 200° C. for a period which is preferably in the region of 6 hours. According to the invention, the product obtained in the first step is reacted with the remainder of the diethylene glycol and propylene glycol with all of the maleic anhydride. This second step is carried out at a temperature of 180° to 220° for 10 and 12 hours.

The quantities of reactants required to make use of the invention are conventional quantities employed in the manufacture of unsaturated polyester resins. Diethylene glycol and propylene glycol are employed in any proportions. The polyols are employed with ortho-phthalic anhydride in the $$\text{molar proportions} \frac{\text{polyols}}{\text{ortho-phthalic anhydride}} = \frac{1}{0.5 - 0.05},$$

and with maleic anhydride in the molar proportions $$\frac{\text{polyols}}{\text{maleic anhydride}} = \frac{1}{0.5 - 0.95}, \text{ the anhydrides being}$$

employed in the molar proportions $\frac{\text{maleic anhydride}}{\text{phthalic anhydride}}$ of 1 to 20.

The polyester resins obtained according to the process of the invention produce resins exhibiting linear maturing with magnesia and consequently good control of the maturing and an accurate adjustment of the viscosity level within ranges which are compatible with conversion by injection.

Such resins make possible the maufacture of preimpregnated materials which can be injected, containing magnesia, exhibiting good behaviour on molding and good mechanical properties according to the known techniques of:

molding of a mat of resin and impregnated glass fibres (sheet molding compound: SMC, or thick molding compound: TMC)

molding of a resin and bulk impregnated glass fibres (bulk molding compound: BMC).

In a known manner, the reinforcing fibres employed for the manufacture of prepregs are represented by natural fibres such as linen, asbestos, jute, cotton, and synthetic fibres such as nylon, glass, carbon, graphite and paper. Used on their own or mixed, these fibres may be in the form of strands, filaments, mats or textiles.

The following examples illustrate the present invention. The maturing of the resins obtained according to the invention is evaluated by subjecting the resin to the "penetrometer" test.

This test is carried out by using a "penetrometer" which consists of:
a supporting rod
a pedestal mounted on this rod
a needle-carrier rod above which is a graduated dial fixed to the supporting rod: the needle-carrier rod has a needle consisting of a 340 g cylinder 1 cm in diameter.

A mixture of 100 grams of resin and 100 g of ground calcium carbonate is prepared; x percent of MgO "Maglite DE" (product sold by MERCK) are then added, the values of x in each test being 0.8, 0.9, 1.0, 1.1 and 1.2. Measurements are made between the 1st and the 28th day by noting the time corresponding to a needle penetration into the mixture of 15 millimeters at a temperature of 23° C.

EXAMPLE 1

In a first step, a polycondensate is prepared by condensing:
2,873 parts of propylene glycol
2,968 parts of diethylene glycol
3,730 parts of ortho-phthalic anhydride
for 5 hours at a temperature of 200° C.

In a second step, 6,065 parts of propylene glycol and 11,250 parts of maleic anhydride are added. The condensation is carried out for 5 hours at a temperature of 215° C. under a pressure of 200 mm of mercury. 19,850 parts of polycondensate are obtained, which are dissolved in 11,500 parts of styrene. The resin produced has the following properties:
viscosity: 1.97 Pa s at 25° C.
acid number: 31.2 (bulk)
difference between the acid number and the hydroxyl number: +1
molecular weight: 1,825.

The resin produced is subjected to the penetrometer test. Curve 1 shows the results for various values of x as specified above.

EXAMPLE 2

Example 1 is repeated, but with the first-step condensation being carried out for 6½ hours and using 6,278 parts of propylene glycol instead of 6,065 in the second step, all the other values being identical to those in Example 1.

After dissolution in styrene, a resin is produced which has the following properties:
viscosity: 1.93 Pa s at 25° C.
acid number: 28
bulk difference between the acid number and the hydroxyl number: −5
molecular weight: 1,840
Curve 2 shows the results of the penetrometer tests.

EXAMPLE 3 (Comparative)

Example 1 is repeated but with all the propylene glycol charged in the first step, which is also carried out for 7 hours at 200° C.

The resin produced has the following properties:
viscosity: 2.8 Pa s at 25° C.

acid number: 51
difference between the acid number and the hydroxyl nuumber: +40
molecular weight: 1,810
Curve 3 shows the test results obtained with the penetrometer.

EXAMPLE 4

Example 1 is repeated but with the first step carried out for 6 hours and with the addition of 6,384 parts of propylene glycol in the second step.
The resin produced has the following properties:
viscosity: 2.19 Pa s at 25° C.
acid number: 20.75
difference between the acid number and the hydroxyl number: −18.5
molecular weight: 1,870
Curve 4 shows the test results obtained with the penetrometer.

EXAMPLE 5 (Comparative)

By way of comparison, a resin is prepared by using isophthalic anhydride in a known manner instead of orthophthalic anhydride. In a first step, carried out for 6 hours at 220° C., use is made of:
5,681 parts of propylene glycol
6,201 parts of diethylene glycol
8,632 parts of isophthalic anhydride.
The product produced in the first step is then condensed with 7,644 parts of maleic anhydride. After condensation at 225° C. under a reduced pressure of 150 mm of mercury and dissolution in styrene in a proportion of 60% of resin to 40% of styrene, a resin is produced which has the following properties:
viscosity: 1.2 Pa s at 25° C.
acid number: 20
difference between the acid number and the hydroxyl number: −5
molecular weight: 2,300
Curve 5 shows the results of the penetrometer tests.

EXAMPLE 6 (Comparative)

Example 4 is repeated but with all the reactants being added in a single step. After processing, a resin is produced which has the following properties:
viscosity: 2 Pa s at 25° C.
acid number: 24.1
difference between the acid number and the hydroxyl number: −20
molecular weight: 1,645
Curve 6 shows the results of the penetrometer tests; a drop is found in the curve after 15 days, characterised by an initiation of softening.
No such drop is seen when the process is carried out in two steps.

EXAMPLE 7

A polycondensate is prepared by condensing, in a first step:
1,424 parts of diethylene glycol
4,086 parts of propylene glycol
3,575 parts of ortho-phthalic anhydride
for 5 hours 30 minutes at a temperature of 200° C.
In a second step, 5,107 parts of propylene glycol and 10,793 parts of maleic anhydride are added. The condensation is carried out for 9 hours at a temperature of 215° C. under a pressure of 250 mm of mercury.

24,985 parts of polycondensate are obtained and dissolved in 16,600 parts of styrene. The resin produced has the following properties:
viscosity: 3 Pa s at 25° C.
acid number: 27 (bulk)
difference between the acid number and the hydroxyl number: −16.5
molecular weight: 1,590
Curve 7 shows the results of the penetrometer tests.

EXAMPLE 8

Example 7 is repeated but with the diethylene glycol left out. In a first step, use is made of:
4,877 parts of propylene glycol
3,633 parts of phthalic anhydride
and in a second step:
5,502 parts of propylene glycol
10,978 parts of maleic anhydride.
After condensation, the resin produced after dissolution in styrene in a proportion of 60 parts of resin per 40 parts of styrene has the following properties:
viscosity: 2.8 Pa s
acid number: 26.7 (bulk)
difference between the acid number and the hydroxyl number: −17.3
molecular weight: 1,585
Curve 8 shows the results of a penetrometer test.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

I claim:

1. In a process for the production of an unsaturated polyester resin, comprising reacting at least one polyol with at least one $\alpha,\beta$-unsaturated polycarboxylic acid or anhydride and at least one saturated polycarboxylic acid or anhydride, and adding a magnesia thickener to stabilize and crosslink the resin,
the improvement comprising preparing said polycondensate by in a first step reacting a first amount of at least one polyol with a least one saturated polycarboxylic acid or anhydride and in a second step adding to the reaction product of the first step a second amount of at least one polyol and at least one $\alpha,\beta$-unsaturated carboxylic acid or anhydride, wherein the amount of the polyol employed in the first step is up to 30% by weight based on the total quantity of polyol used in the process and subjecting the resultant mixture to additional polycondensation to complete said reacting, whereby the resulting polycondensate can be admixed with a vinyl monomer and magnesia in order to effect linear maturing of the crosslinkable resin.

2. A process according to claim 1, wherein the resultant polycondensate is mixed with a vinyl monomer and sufficient magnesia is added to linearly control the maturing of the polymer.

3. A process according to claim 1, wherein the polyol is ethylene glycol, propylene glycol, diethylene glycol, triethylene glycol, tetraethylene glycol, neopentyl glycol, butylene glycol, dipropyleneglycerol, trimethylolpropane, pentaerythritol, trimethylpentanediol, trimethylpropanediol, 1,6-hexamethylenediol, hydrogenated bisphenol A or mixtures thereof.

4. A process according to claim 1, wherein the α,β-unsaturated polycarboxylic acid or anhydride is maleic acid, maleic anhydride, itaconic acid, itaconic anhydride, fumaric acid, mesaconic acid or mixtures thereof.

5. A process according to claim 1, wherein the saturated polycarboxylic acid is succinic acid, methylsuccinic acid, adipic acid, sebacic acid, ortho-phthalic acid, tetrachlorophthalic acid, hexachloroendomethylenetetrahydrophthalic acid, trimellitic acid, isophthalic acid, succinic anhydride, methylsuccinic anhydride, adipic anhydride, sebacic anhydride, orthophthalic anhydride, tetrachlorophthalic anhydride, hexachloroendomethylenetetrahydrophthalic anhydride, trimellitic anhydride, isophthalic anhydride, and mixtures thereof.

6. A process according to claim 5, wherein the polyol is a mixture of diethylene and propylene glycol.

7. A process according to claim 6, wherein the amount of polyol in the first step is 0-20% by weight of diethylene glycol and 30-10% by weight of propylene glycol based on the total amount of polyol used in the process.

8. A process according to claim 7, wherein the α,β-unsaturated polycarboxylic acid or anhydride is ortho-phthalic anhydride and the saturated polycarboxylic acid or anhydride is maleic anhydride.

9. A process according to claim 8, wherein the molar ratio of polyol to orthophthalic anhydride is 1:0.5-0.05 and the molar ratio of polyol to maleic anhydride is 1:0.5-0.95.

10. A process according to claim 8, wherein the molar ratio of maleic anhydride to orthophthalic anhydride is 1-20.

11. A process according to claim 1, wherein the vinyl monomer is styrene, α-methylstyrene, a chlorinated styrene, vinyltoluene, divinylbenzene, allyl phthalate, triallyl cyanurate, or a lower alkyl acrylate.

12. An unsaturated polyester resin produced according to claim 1.

13. An unsaturated polyester resin produced according to claim 9.

14. An unsaturated polyester resin produced according to claim 11.

15. In a process for the production of a preimpregnated material comprising reacting at least one polyol with at least one α,β-unsaturated polycarboxylic acid or anhydride and at least one saturated polycarboxylic acid or anhydride, dissolving the resultant polycondensate in a vinyl monomer, adding reinforcing fibers and a magnesium thickener to stabilize and thicken the material by:
the improvement comrpising preparing said unsaturated polycondensate by in a first step reacting a first amount of at least one polyol with at least one saturated polycarboxylic acid or anhydride and in a second step adding to resultant reaction product of the first step a second amount of at least one polyol and at least one α,β-unsaturated carboxylic acid or anhydride, wherein the amount of the polyol employed in the first step is up to 30% by weight based on the total quantity of polyol used in the process subjecting resultant mixture to additional polycondensation to complete said reacting, whereby the thickening of the preimpregnated material varies linearly with the amount of magnesium thickener added.

16. A process according to claim 15, wherein the polyol is ethylene glycol, propylene glycol, diethylene glycol, triethylene glycol, tetraethylene glycol, neopentyl glycol, butylene glycol, dipropyleneglycerol, trimethylolpropane, pentaerythritol, trimethylpentanediol, trimethylpropanediol, 1,6-hexamethylenediol, hydrogenated bisphenol, A or mixtures thereof.

17. A process according to claim 15, wherein the α,β-unsaturated polycarboxylic acid or anhydride is maleic acid, maleic anhydride, itaconic acid, itaconic anhydride, fumaric acid, mesaconic acid or mixtures thereof.

18. A process according to claim 15, wherein the saturated polycarboxylic acid is succinic acid, methylsuccinic acid, adipic acid, sebacic acid, ortho-phthalic acid, tetrachlorophthalic acid, hexachloroendomethylenetetrahydrophthalic acid, trimellitic acid, isophthalic acid, succinic anhydride, methylsuccinic anhydride, adipic anhydride, sebacic anhydride, orthophthalic anhydride, tetrachlorophthalic anhydride, hexachloroendomethylenetetrahydrophthalic anhydride, trimellitic anhydride, isophthalic anhydride, and mixtures thereof.

19. A process according to claim 18, wherein the polyol is a mixture of diethylene and propylene glycol.

20. A process according to claim 19, wherein the amount of polyol in the first step is 0-20% by weight of diethylene glycol and 30-10% by weight of propylene glycol based on the total amoutn of polyol used in the process.

21. A process according to claim 20, wherein the α,β-unsaturated polycarboxylic acid or anhydride is ortho-phthalic anhydride and the saturated polycarboxylic acid or anhydride is maleic anhydride.

22. A process according to claim 15, wherein the vinyl monomer is styrene, α-methylstyrene, a chlorinated styrene, vinyltoluene, divinylbenzene, allyl phthalate, triallyl cyanurate, or a lower alkyl acrylate.

23. An unsaturated polyester resin produced according to claim 15.

* * * * *

UNITED STATES PATENT AND TRADEMARK OFFICE
CERTIFICATE OF CORRECTION

PATENT NO.  : 4,663,393
DATED       : May 5, 1987
INVENTOR(S) : Patrick Arlaud et al It is certified that error appears in the above-identified patent and that said Letters Patent is hereby corrected as shown below:

Column 6, Claim 1, Line 47:

reads:   "at least one polyol with a least one saturated poly-"
  should read:  --at least one polyol with at least one saturated poly- --

Column 7, Claim 15, Line 53:

reads:   "the improvement comrpising preparing said unsatu-"
  should read:  --the improvement comprising preparing said unsatu- --

Signed and Sealed this

Eighteenth Day of August, 1987

*Attest:*

DONALD J. QUIGG

*Attesting Officer*    *Commissioner of Patents and Trademarks*